US008583096B2

(12) United States Patent
Ruan et al.

(10) Patent No.: US 8,583,096 B2
(45) Date of Patent: *Nov. 12, 2013

(54) METHOD, SYSTEM AND APPARATUS FOR HANDLING A CALL RECEIVED AT A MOBILE COMMUNICATION DEVICE

(71) Applicant: Research In Motion Limited, Waterloo (CA)

(72) Inventors: Zhigang Ruan, Waterloo (CA); Richard John George, Waterloo (CA)

(73) Assignee: Blackberry Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,973

(22) Filed: Oct. 23, 2012

(65) Prior Publication Data
US 2013/0045727 A1 Feb. 21, 2013

Related U.S. Application Data

(63) Continuation of application No. 12/845,805, filed on Jul. 29, 2010, now Pat. No. 8,326,275.

(51) Int. Cl.
*H04M 11/00* (2006.01)
(52) U.S. Cl.
USPC .......................... 455/415; 370/331; 370/338

(58) Field of Classification Search
USPC .......................................... 455/415; 370/338
See application file for complete search history.

(56) References Cited

U.S. PATENT DOCUMENTS

2006/0105747 A1* 5/2006 Lipsit ........................... 455/411

OTHER PUBLICATIONS

Ruan et al., U.S. Appl. No. 12/845,805, filed Jul. 29, 2010 entitled "Method, System and Apparatus for Handling a Call Received At a Mobile Communication Device".

* cited by examiner

*Primary Examiner* — Marcos Batista
(74) *Attorney, Agent, or Firm* — Perry + Currier

(57) ABSTRACT

A method, apparatus and system for handling a call received at a mobile communication device, in association with an automated number identification (ANI) number are provided. The ANI number is compared with a list of ANI numbers associated with an applications server, the list stored at the mobile communications device. When the ANI number is not in the list, a tone is provided on the call. When a corresponding tone is detected on the call in response to the tone, the call is handled as a call associated with the applications server and otherwise the call handled as a typical mobile communication call.

19 Claims, 18 Drawing Sheets

METHOD, SYSTEM AND APPARATUS FOR HANDLING A CALL RECEIVED AT A MOBILE COMMUNICATION DEVICE

FIELD

The specification relates generally to mobile communication devices, and specifically to a method, system and apparatus for handling a call received at a mobile communication device.

BACKGROUND

At a mobile communication device, Automatic Number Identification (ANI) can be used to determine whether an incoming call is from an applications server providing certain services to the mobile communication device, in conjunction with an application client. However, ANI numbers of some incoming calls in certain networks (e.g. roaming networks) cannot be reliably delivered to the mobile communication device. Hence the mobile communication device and application client will not know if the call is from the application server, which precludes the services offered, as technology for handling calls with mangled ANI numbers is currently deficient.

BRIEF DESCRIPTIONS OF THE DRAWINGS

Implementations are described with reference to the following figures, in which.

Similar reference numerals may have been used in different figures to denote similar components.

DETAILED DESCRIPTION OF THE IMPLEMENTATIONS

Figure 1:
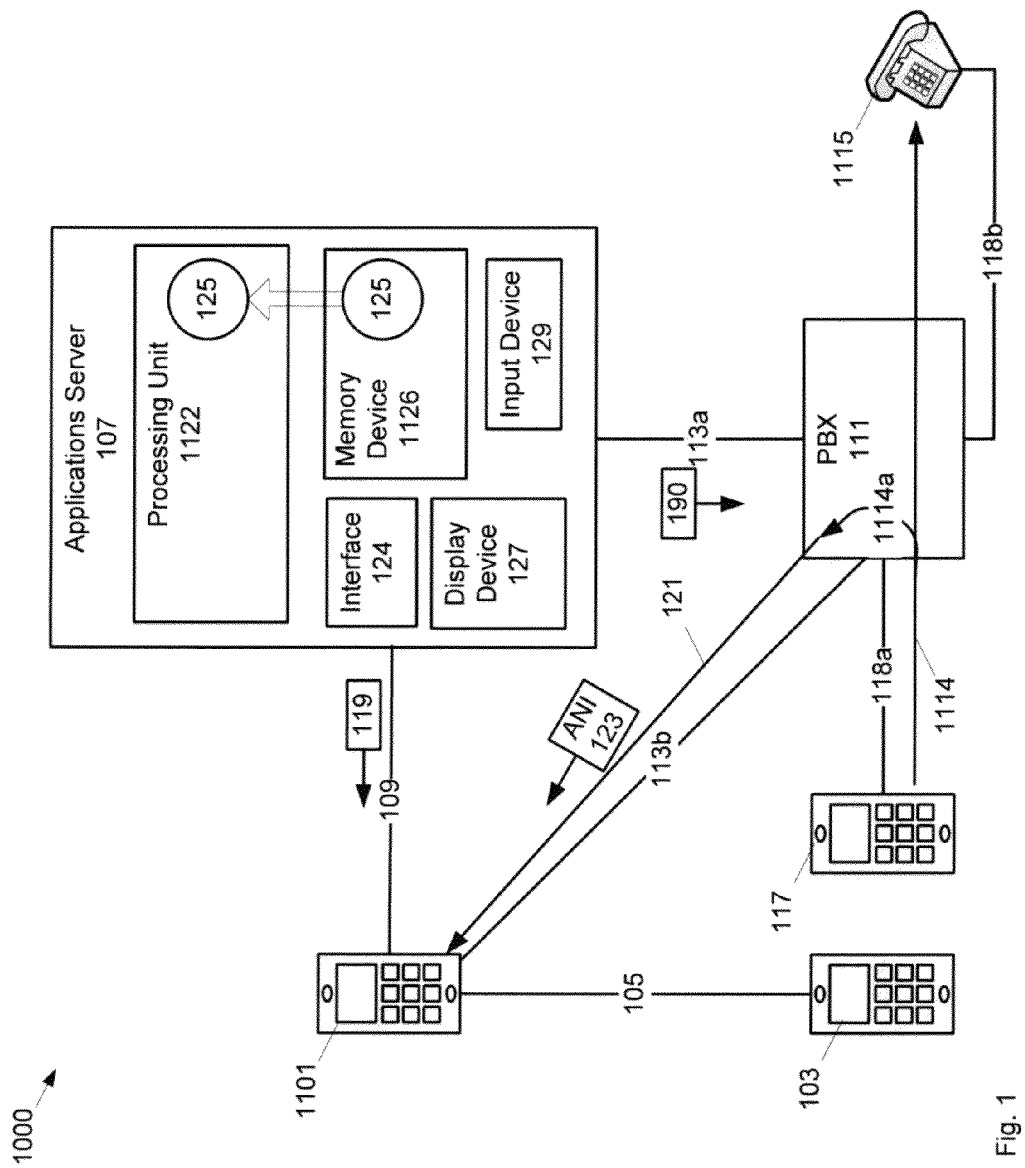
FIG. 1 depicts block diagram of a system for handling a call received at a mobile communication device, according to non-limiting implementations.

A first aspect of the specification provides a method for handling a call received at a mobile communication device, in association with an automated number identification (ANI) number, the method implementable at the mobile communication device, the method comprising: comparing the ANI number with a list of ANI numbers associated with an applications server, the list stored at the mobile communications device; when the ANI number is not in the list, providing a tone on the call; and, when a corresponding tone is detected on the call in response to the tone, handling the call as a call associated with the applications server and otherwise handling the call as a mobile communication call from a communication device.

The providing the tone can be initiated only when the mobile communication device is in a verification mode. The mobile communication device can enter the verification mode when the mobile communication device is roaming outside of a home communication network and the mobile communication device can exits the verification mode when the mobile communication device is next in direct communication with the home communication network. The mobile communication device can enter the verification mode upon receiving a message from the applications server, the message for triggering the mobile communication device to enter the verification mode. The mobile communication device can exit the verification mode upon receiving a message from the applications server, the message for triggering the mobile communication device to exit the verification mode. The mobile communication device can enter the verification mode upon receiving input data from an input device, the input data indicative that the mobile communication device is to be placed in the verification mode. The mobile communication device can exit the verification mode upon receiving input data from an input device, the input data indicative that the mobile communication device is to exit the verification mode.

The applications server can be enabled to; determine that the tone has been provided; and cause the corresponding tone to be provided. The applications server can determine that the tone has been provided by receiving a message from a PBX where the tone is detected, and cause the corresponding tone to be provided by transmitting a message to the PBX to trigger the PBX to provide the corresponding tone.

Handling the call as a call associated with the applications server can comprise enabling an applications client at the mobile electronic device to provide services available via the applications server.

Each of the tone and the corresponding tone can comprises a DTMF (Dual-tone multi-frequency) tone. The tone and the corresponding tone can be similar. The tone and the corresponding tone can be different.

A second aspect of the specification provides a mobile communication device for handling a call received in association with an automated number identification (ANI) number, the mobile communication device comprising: a processing unit interconnected with a memory device and a communication interface. The processing unit is enabled to compare the ANI number with a list of ANI numbers associated with an applications server, the list stored at the memory device; when the ANI number is not in the list, provide a tone on the call via the communications interface; and when a corresponding tone is detected on the call in response to the tone, handle the call as a call associated with the applications server and otherwise handle the call as a mobile communication call from a communication device.

The processing unit can be further enabled to initiate providing the tone only when the mobile communication device is in a verification mode.

The processing unit can be further enabled to cause the mobile communication device to enter the verification mode when the processing unit determines that the mobile communication device is roaming outside of a home communication network. The processing unit can be further enabled to cause the mobile communication device to exit the verification mode when the processing unit determines that the mobile communication device is next in communication with the home communication network. The processing unit can be further enabled to cause the mobile communication device to enter the verification mode upon receiving a message from the applications server via the communication interface, the message for triggering the mobile communication device to enter the verification mode. The processing unit can be further enabled to cause the mobile communication device to exit the verification mode upon receiving a message from the applications server, the message for triggering the mobile communication device to exit the verification mode. The processing unit can be further enabled to cause the mobile communication device to enter the verification mode upon receiving input data from an input device, the input data indicative that the mobile communication device is to be placed in the verification mode. The processing unit can be further enabled to cause the mobile communication device to exit the verification mode upon receiving input data from an input device, the input data indicative that the mobile communication device is to exit the verification mode.

The processing unit can be further enabled to handle the call as a call associated with the applications server by enabling an applications client at the mobile electronic device to provide services available via the applications server.

Each of the tone and the corresponding tone can comprises a DTMF tone. The tone and the corresponding tone can be similar. The tone and the corresponding tone can be different.

A third aspect of the specification provides a method for verifying a call to a mobile communication device, the call associated with an ANI number which is in turn associated with an applications server, the method implementable at the applications server. The method comprises: determining that a tone has been provided by the mobile communications device on the call, the tone for indicating that the mobile communications device is seeking verification that the call is associated with the applications server; and, in response, causing a corresponding tone to be provided on the call to trigger the mobile communications device to handle the call as a call associated with the applications server.

Determining that a tone has been provided can comprise receiving a message from a PBX where the tone is detected. Causing the corresponding tone to be provided can comprise transmitting a message to the PBX to trigger the PBX to provide the corresponding tone.

A fourth aspect of the specification provides an application server for verifying a call to a mobile communication device, the call associated with an ANI number which is in turn associated with the applications server. The applications server comprises a processing unit interconnected with a communications interface. The processing unit is enabled to: determine that a tone has been provided by the mobile communications device on the call, the tone for indicating that the mobile communications device is seeking verification that the call is associated with the applications server; and, in response, cause a corresponding tone to be provided on the call to trigger the mobile communications handle the call as a call associated with the applications server.

The processing unit can be further enabled to determine that a tone has been provided by receiving a message from a PBX where the tone is detected. The processing unit can be further enabled to cause the corresponding tone to be provided by transmitting a message to the PBX to trigger the PBX to provide the corresponding tone.

A fifth aspect of the specification provides a system for handling a call associated with an ANI number. The system comprises an applications server and at least one communications device in communication with the applications server. The applications server is enabled to: provide services to mobile communications devices, the ANI number associated with the applications server; determine that a tone has been provided by at least one of the mobile communications device on the call, the tone for indicating that the at least one of the mobile communications devices is seeking verification that the call is associated with the applications server; and, in response, cause a corresponding tone to be provided on the call to trigger the at least one of the mobile communications device to handle the call as a call associated with the applications server. The at least one mobile communication device is enabled to: compare the ANI number with a list of ANI numbers associated with the applications server, the list stored at the at least one mobile communications device; when the ANI number is not in the list, provide the tone on the call; and, when the corresponding tone is detected on the call in response to the tone, handle the call as a call associated with the applications server and otherwise handle the call as a mobile communication call from a communication device.

A sixth aspect of the specification provides a computer program product, comprising a computer usable medium having a computer readable program code adapted to be executed to implement a method for handling a call received at a mobile communication device, in association with an ANI number, the method implementable at the mobile communication device, the method comprising: comparing the ANI number with a list of ANI numbers associated with an applications server, the list stored at the mobile communications device; when the ANI number is not in the list, providing a tone on the call; and, when a corresponding tone is detected on the call in response to the tone, handling the call as a call associated with the applications server and otherwise handling the call as a mobile communication call from a communication device.

A seventh aspect of the specification provides a computer program product, comprising a computer usable medium having a computer readable program code adapted to be executed to implement a method for verifying a call to a mobile communication device, the call associated with an ANI number which is in turn associated with an applications server, the method implementable at the applications server, the method comprising: determining that a tone has been provided by the mobile communications device on the call, the tone for indicating that the mobile communications device is seeking verification that the call is associated with the applications server; and, in response, causing a corresponding tone to be provided on the call to trigger the mobile communications device to handle the call as a call associated with the applications server.

FIG. 1 depicts a system 1000 for handling a call received at a mobile communication device 1101, according to non-limiting implementations. Mobile communication device 1101 will hereafter be interchangeably referred to as device 1101. Device 1101 can receive calls at least from a communication device 103 via a link 105, and an applications server 107 via a PBX 111 and links 113a, 113b. In general, applications server 107 (hereinafter server 107) is enabled to monitor PBX 111 via link 113a to determine whether PBX 111 is receiving a call 1114 for another communication device 1115 (hereinafter device 1115) associated with device 1101: for example, yet a further communication device 117 can be calling device 1115 via PBX 111 via a link 118a and a link 118b.

Server 107 detects that PBX 111 is receiving call 1114 and initiates a data communication session with device 1101 via an invitation message 119, which can sent on a data channel in link 109. Server 107 then initiates a call 121 from PBX 111 to device 1101 on a separate communication channel via PBX 111 and links 113a, 113b. In some non-limiting implementations, call 121 can be between server 107 and device 1101 via PBX 111, however in other non-limiting implementations, as depicted, server 107 can control PBX 111 to initiate call 121 by transmitting a command 190 to PBX 111. Hence, both device 1101 and device 1115 are alerted of call 1114 (e.g. both device 1101 and device 1115 "ring" simultaneously, allowing either device 1101 or device 1115 to pick up call 1114). If device 1101 picks up call 1114 first, then server 107 causes PBX 111 to connect call 1114 with call 121 via a connection 1114a.

Figure 2:
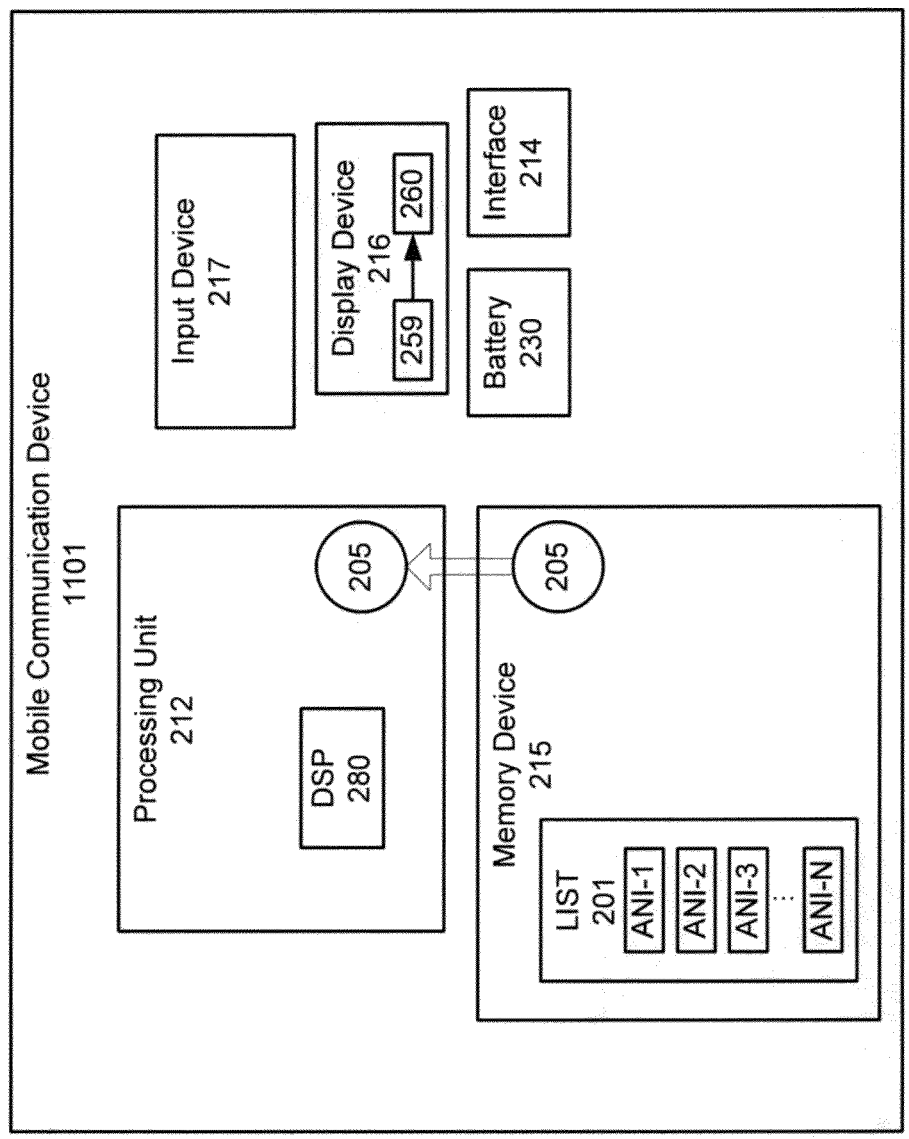
FIG. 2 depicts a block diagram of a mobile communication device for handling a call, according to non-limiting implementations.

It is further appreciated that, call 121 is associated with an ANI number 123 (referred to hereafter as ANI 123), which is transmitted to device 1101 on link 113b in signalling for setting up call 121. In general, ANI 123 identifies call 121 as being from server 107, which in turn causes device 1101 to handle call 121 as a call associated with server 107. As depicted in FIG. 2, which depicts device 1101 in further detail, according to non-limiting implementations, device 1101 stores a list 201 of ANIs, ANI-1, ANI-2, ANI-3 . . . ANI-N, associated with applications server 107. For example, system 1000 can be configured such that any associated with server 107 will be associated with one of the ANIs in list 201, and list 201 can be stored at device 1101 in a provisioning process (e.g. when an application client 205 is installed and/or provisioned), and if further ANIs are assigned to server 107, list 201 can be updated in an updating and/or synchronization process.

If ANI 123 is in list 201, then device 1101 interprets call 121 as a associated with server 107: for example, it is further appreciated that server 107 comprises an application 125 which can make PBX-like services available to device 1101 when call 121 is picked up at device 1101, and call 1114a is connected. It yet further appreciated that such services can be requested via a client application client 205 stored and processed at device 1101, with further reference to FIG. 2

However, in some networks in link 113b (e.g. networks outside of a home network of device 1101), ANI 123 can be mangled and/or changed and hence call 121 is not recognized at device 1101 as a call associated with server 107. Rather call 121 is recognized as a typical mobile communication call, similar to a call between devices 1101, 103 via link 105. Hence, the services available via application 125 and client application client 205 are not made available. In some cases, call 121 could be rejected by device 1101 if ANI 123 is not in list 201 if device 1101 is expecting to receive a call associated with server 107.

Figure 3:
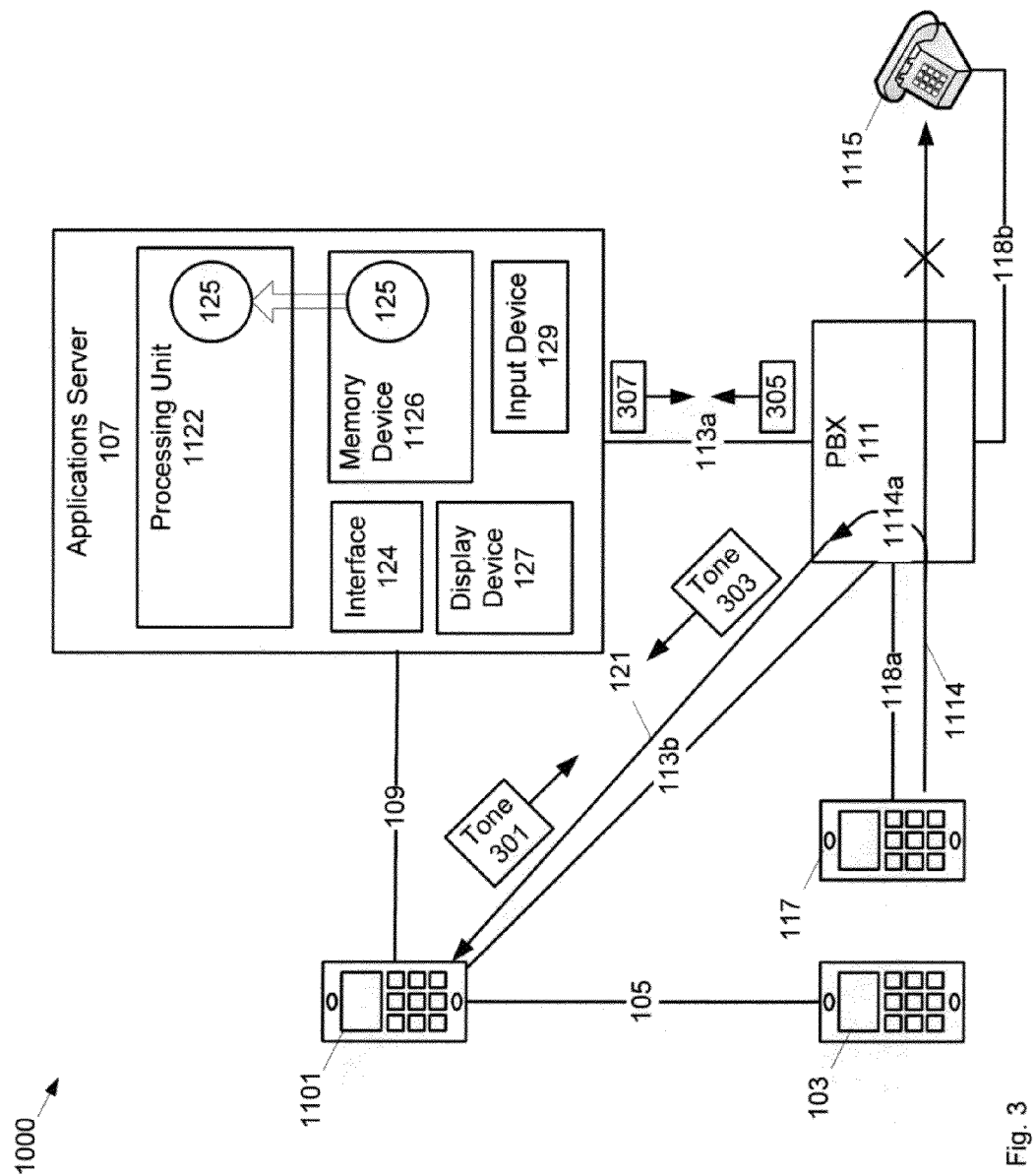
FIG. 3 depicts a block diagram of a system for handling a call received at a mobile communication device, according to non-limiting implementations.

With reference to FIG. 3, which is substantially similar to FIG. 1, with like elements having like numbers, device 1101 can determine whether call 121 is being received from server 107 or a communication device 103 by providing a tone 301 on call 121. In it appreciated that transmission of tone 301 can occur only when ANI 123 is not in list 201. In some implementations, as described below, transmission of tone 301 will occur when device 1101 is in a verification mode and transmission of tone 301 will not occur when device 1101 is not in the verification mode. In any event, server 107 is enabled to determine when tone 301 has occurred on call 121 and in response cause a corresponding tone 303 to be provided on call 121. Once device 1101 detects corresponding tone 303, device 1101 handles call 121 as being from server 107 and the PBX-like services are made available via application 125 and client application client 205. Otherwise, when corresponding tone 303 is not detected, device 1101 handles call 121 as if it were a typical mobile communication call. As will be described below, in some implementations, PBX 111 detects tone 301 and informs server 107 that tone 301 has occurred via link 113a; in response, server 107 transmits a command to PBX 111 to cause PBX 111 to provide corresponding tone 303. However, in some implementations, server 107 can detect tone 301 and provide corresponding tone 303 via a voice channel between device 1101 and server 107 on links 113a, 113b.

Elements of system 1000 are now described in further detail.

Each link 105, 109, 113a, 113b, 118a, 118b generally comprises any suitable combination of wired or wireless links. Hence, links 105, 109, 113a, 118a, 118b can comprise a wireless network, such as a wireless carrier network, including but not limited to any suitable cell phone network (1X, UMTS (Universal Mobile Telecommunications System), CDMA (code division multiple access), GSM (Global System for Mobile communications), EVDO (Evolution-Data Optimized), HSPA (High Speed Packet Access), 3GPP ($3^{rd}$ Generation Partnership Project), 3G ($3^{rd}$ Generation), EDGE (Enhanced Data rates for GSM Evolution), or the like), in combination with any suitable combination of wired or wireless networks as desired, including but not limited to a packet based network, the Internet, an analog network, the PSTN (public switched telephone network), a Wi-Fi network, a Wi-Max network and the like. However, in some implementations, one or more of links 105, 109, 113a, 113b, 118a, 118b can comprise any suitable combination of wired or wireless networks, including but not limited to a packet based network, the Internet, an analog network, the PSTN, a Wi-Fi network, a Wi-Max network and the like. Furthermore, each of links 105, 109, 113a, 118a, 118b can be similar or different as desired, in particular link 109 is enabled to carry a data channel between device 1101 and server 107, and links 113b is enabled to carry a voice channel between device 1101 and PBX 111, and link 113a is enabled to convey commands and data between PBX 111 and server 107. In some non-limiting implementations, link 113a and 113b can convey voice data between device 1101 and server 107

Server 107 generally comprises a processing unit 1122 interconnected with a communication interface 124, and a memory device 1126 (for example via a computing bus, not depicted). In some implementations, server 107 can further comprise, or alternatively be connected to, a display device 127 and an input device 129. Server 107 can include but is not limited to any suitable combination of a computer, a mainframe computer, a server and the like. Other suitable types of servers and computing devices are within the scope of present implementations.

Processing unit 1122 can comprise any suitable processor, or combination of processors, including but not limited to a microprocessor, CPU (central processing unit), or the like.

Communications interface 124 is enabled to communicate with device 1101 on a data channel via link 109 and on a voice channel via PBX 111 links 113a, 113b. Accordingly, communications interface 124 is enabled to communicate according to any suitable protocol which is compatible with links 109, 113a, 113b including but not limited to packet based protocols, Internet protocols, analog protocols, cell phone protocols (1X, UMTS, CDMA, GMS, 3G, EDGE and the like), PSTN protocols, Wi-Fi protocols, Wi-Max protocols or a combination of these. Other suitable protocols are within the scope of present implementations.

Memory device 1126 can be any suitable one of or combination of volatile memory, non-volatile memory, RAM, ROM, hard drive, optical drive, or the like.

Application 125, in combination with application client 205 at device 1101, enables server 107 to provide some or all PBX services available at device 1115 at device 1101, for example when engaged in calls 121/1114 (e.g. call forwarding, calling an extension at PBX 111) by exchanging commands via link 109, and transmitting commands to PBX 111 on link 113a. Application 125 can be stored in memory device 1126 and processed by processing unit 1122, for example, while server 107 is turned on.

As depicted in FIG. 2, according to non-limiting implementations, each device 1101 comprises a processing unit 212 interconnected with a communication interface 214, a memory device 215, a display device 216, and an input device 217, all in communication, for example, via a computing bus (not depicted), and powered by a battery 230. Each of processing unit 212, communication interface 214, and memory device 215 can be respectively similar to processing unit 1122, communication interface 124, and memory device 1126 described above. In particular, memory device 215 is enabled to store list 20, and interface 214 is enabled to communicate with server 107 via link 109. Further, processing unit 212 is enabled to detect corresponding tone 303 on call 121: for example, in some units processing unit 212 can comprise a digital signal processor (DSP) 280 for processing data received on call 121. In some implementations, DSP 280 can be a separate element controlled by processing unit 212.

Application client 205, in combination with application 125 at server 107, enables device 1101 to provide some or all PBX services available at device 1115 at device 1101, for example when engaged in calls 121/1114 (e.g. call forwarding, calling an extension at PBX 111) by exchanging data on data channel via link 109. Application 140 can be stored in memory device 215 and processed by processing unit 212, for example when device 1101 is turned on.

Display device 216 comprises circuitry 259 for generating representations of data, such as data 250, for example a representation 260. Display device 216 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 259 can include any suitable combination of circuitry for controlling the CRT and/or flat panel displays etc., including but not limited to display buffers, transistors, electron beam controllers, LCD cells, plasmas cells, phosphors etc. In particular, display device 216 and circuitry 259 can be controlled by processing unit 212 to generate representation 260.

Input device 217 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Further, device 1101 can comprise any suitable mobile electronic device and/or mobile communication device, including but not limited to a laptop or notebook computer, a PDA, smartphones, a cellular or mobile phone, a portable electronic device, or the like. However, other suitable types of electronic devices are within the scope of present implementations.

Returning to system 1000, while device 1115 is generally a wired communication device enabled to received PBX-based calls from PBX 111, device 103, 117 can be wired or wireless as desired and can be similar to or different from device 1101 or device 1115.

Figure 4:
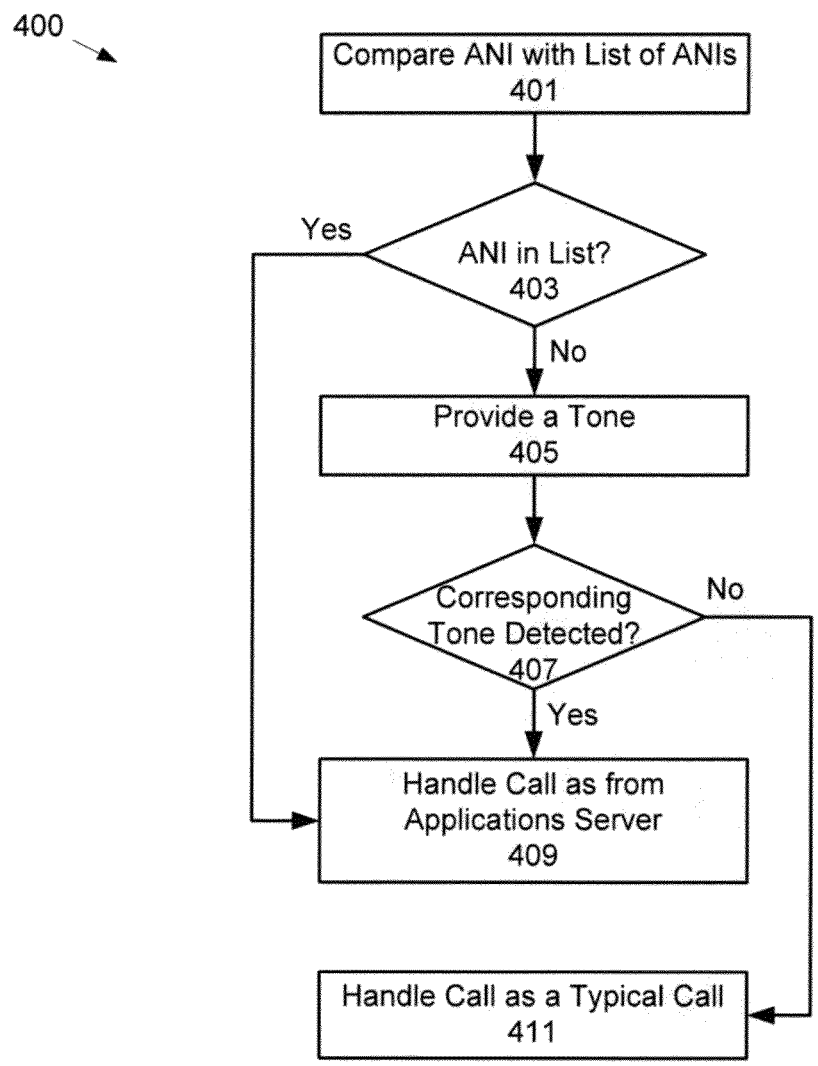
FIG. 4 depicts a flowchart of a method for handling a call received at a mobile communication device according to non-limiting implementations.

Attention is now directed to FIG. 4 which depicts a method 400 for handling a call received at a mobile communication device, in association with an ANI number. In order to assist in the explanation of method 400, it will be assumed that method 400 is performed using system 1000. Furthermore, the following discussion of method 400 will lead to a further understanding of system 1000 and its various components. However, it is to be understood that system 1000 and/or method 400 can be varied, and need not work exactly as discussed herein in conjunction with each other, and that such variations are within the scope of present implementations.

It is further appreciated that method 400 presumes that call 121 and ANI 123 has been received at device 1101, and that method 400 occurs at device 1101.

At step 401, ANI 123 is compared with list 201 of ANIs at processing unit 212. Specifically, as list 201 comprises all ANIs associated with server 107, processing unit 212 can determine whether call 121 is from server 107 by determining if ANI 123 is an element of list 201, as depicted in FIG. 3.

At step 403, when ANI 123 is not in list 201, device 1101 provides tone 301 on call 121 at step 405, otherwise when ANI 123 is in list 201, device handles call 121 as a associated with server 107 at step 409 described below. Tone 301 can comprise a DTMF tone multi frequency) tone or any other suitable tone; in general, it is understood that tone 301 is provided over the communication channel in link 113b on call 121. Hence, tone 301 is detectable at PBX 111, which in turn can notify server 107 of tone 301 via a message 305. However, in implementations where call 121 is between server 107 and device 1101 via PBX 111, tone 301 can be detected at server 107 rather than PBX 111. Furthermore, it is appreciated that tone 301 can comprise a predetermined tone, a series of tones, or any other suitable tone. When tone 301 comprises a predetermined tone, tone 301 can comprise any suitable tone. In some non-limiting implementations, tone 301 can be chosen, based on human factors, to be the least intrusive: for example, if call 121 is not from server 107, tone 301 might be heard at a calling communications device, and hence tone 301 is chosen to be a tone that is on the edge of sounds that are typically audible to humans, for example the highest pitch DTMF tone available or the lowest pitch DTMF tone available.

At step 407, device 1101 determines if corresponding tone 303 is detected on call 121, for example within a given time period (e.g. several seconds). In some embodiments, the downlink audio from PBX 111 to device 1101 can be muted on speaker at device 1101 while device 1101 is waiting for corresponding tone 303 so that if corresponding tone 303 is provided on call 121, it won't be heard by a user of device 1101, though corresponding tone 303 can still be detected at device 1101. When corresponding tone 303 is detected, device 1101 handles call 121 as a call associated with server 107 at step 409, otherwise call 121 is handled call as a typical mobile communication call at step 411. For example, at step 409, handling call 121 as a associated with server 107 can comprise enabling applications client 205 at device 1101 to provide services available via server 107, as described above: for example, commands, messages etc., can be transmitted on a data channel over link 109 to cause server 107 to trigger PBX 111 to provide a corresponding PBX service.

It is appreciated that server 107 is enabled to cause corresponding tone 303 to be provided on call 121 when tone 301 is detected. For example, when server 107 receives message 305, server 107 can transmit a command 307 to PBX 111 causing PBX 111 to provide corresponding tone 303. In some implementations, corresponding tone 303 can be similar to tone 301 or different from tone 301.

In any event, corresponding tone 303 can be provided by at least one on storing an indicator of corresponding tone 303 at server 107 or PBX 111 in a provisioning process (hence corresponding tone 303 is predetermined); by recording tone 301 and providing the recording of tone 301 as corresponding tone 303; by detecting tone 301 and providing a similar tone as corresponding tone 303; recognizing any detected tone of a given type (e.g. DTMF) as tone 301; or any other suitable method.

Device 1101 can be enabled to detect corresponding tone 303 by at least one of: storing an indicator (e.g. a recording, an audio file, and indicator of a DTMF tone, etc.) of corresponding tone 303 at device 1101 in a provisioning process (hence corresponding tone 303 is predetermined); recognizing any detected tone of a given type (e.g. DTMF) as corresponding tone 303; or any other suitable method.

It is appreciated that in some implementations, method 400 is implemented when certain conditions are met. For example, when device 1101 is operating in a home communication network, the chances of ANI 123 being mangled are unlikely: in these situations providing tone 301 whenever ANI 123 is not in list 201 can be inconvenient and a waste of resources at device 1101, server 107 or a calling communications device.

Hence, in some implementations, method 400 is implemented when device 1101 is in a verification mode and is not implemented when device 1101 is not in the verification mode. In general, server 107 can be enabled to cause corresponding tone 303 to be provided whenever tone 301 is detected: indeed, as server 107 can be providing services for a plurality of devices similar to device 1101, detection of tone 301 provides an indication to server 107 that a particular device, in this case device 1101, in a verification mode. Hence, server 107 does not need to explicitly be informed that device 1101 is in the verification mode to cause tone 303 to be provided in response to tone 301. Detection of tone 301 tells server 107 that device 1101 is in a verification mode and wants verification of call 121. There are several contemplated non-limiting implementations for entering and exiting the verifications mode at device 1101, which are described hereafter.

In some implementations, device 1101 automatically enters the verification modes when device 1101 is roaming outside of a home communication network. For example, when device 1101 leave a home communication network and registers with a roaming network, device 1101 can automatically enter a verification mode, wherein method 400 is implemented when a call is received. Device 1101 can exit the verification mode when device 1101 is no longer roaming: for example, device 1101 can register with the home network and thereafter exit verification mode.

Figure 5:
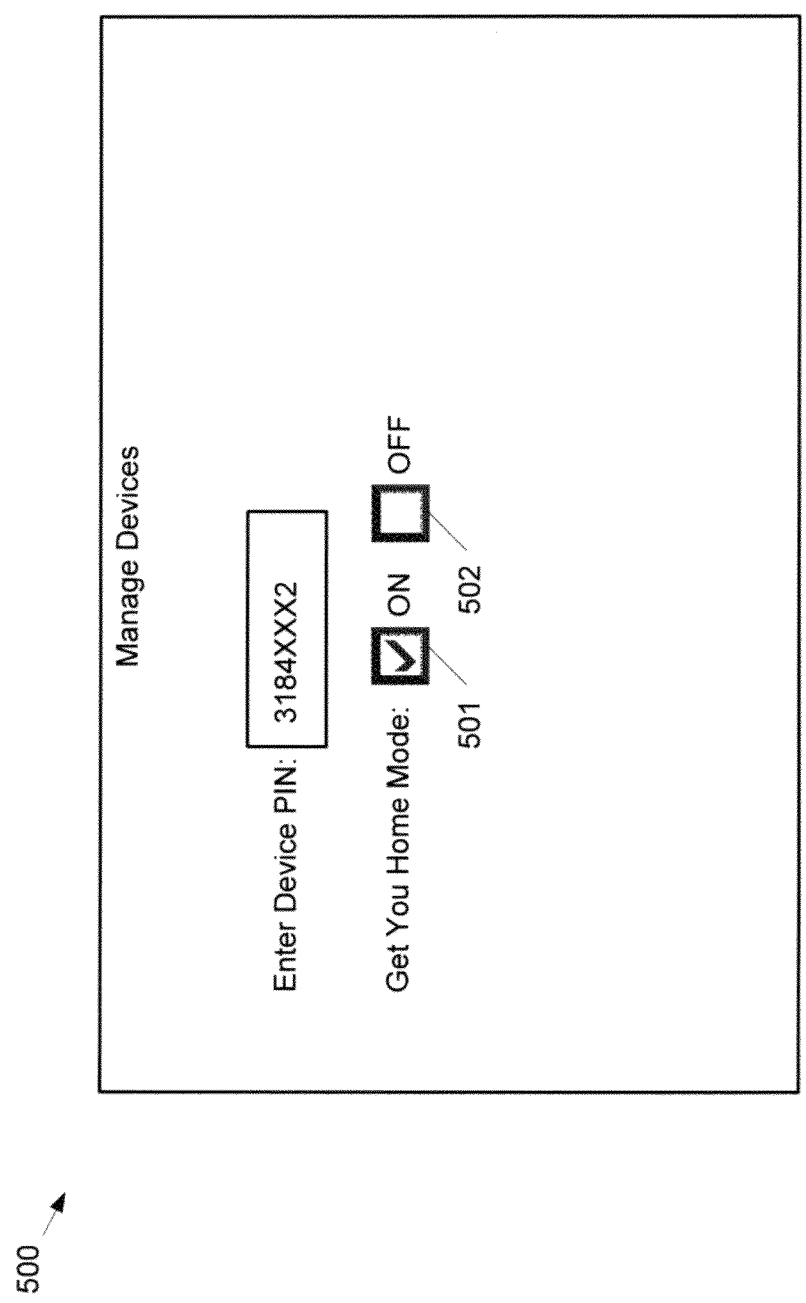
FIG. 5 depicts a representation of a server side Graphical User Interface (GUI) for turning on a verification mode of mobile communication device of FIG. 1, according to non-limiting implementations.
Figure 6:
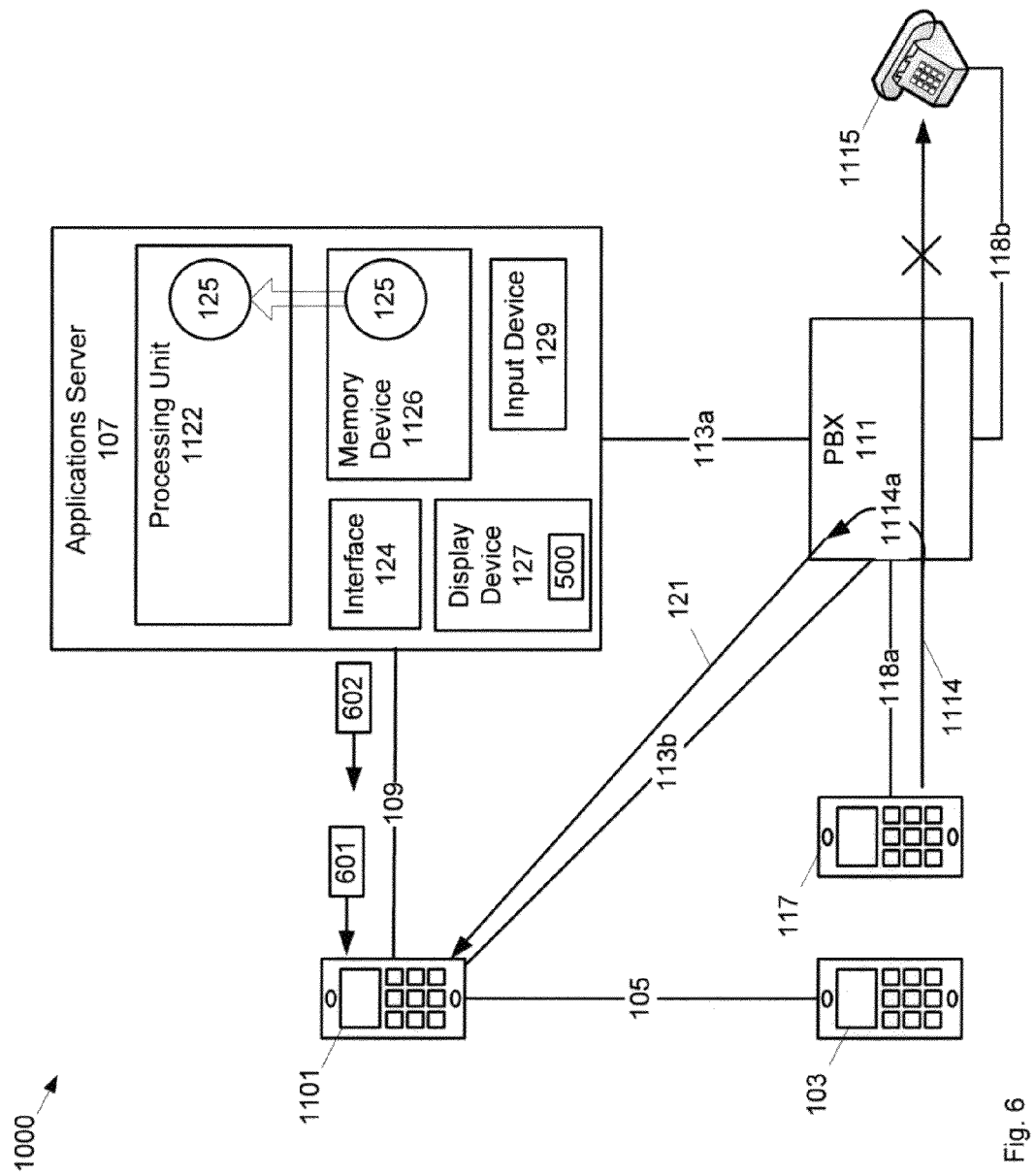
FIG. 6 depicts a block diagram of a system for placing a mobile communication device into a verification mode, according to non-limiting implementations.

In some implementations, server 107 can enter the corresponding verification mode by way of a graphic user interface (GUI) 500, as depicted in FIG. 5 according to non-limiting implementations, for example via a system administrator interacting with GUI 500. Alternatively, and automatic interaction between GUI 500 and a computing device associated with a system administrator can occur (e.g. via automatically scheduled events at the system administrator's computing device) GUI 500 can be provided at least one of display device 127 (as depicted in FIG. 6, substantially similar to FIG. 5, with like elements having like numbers), and a display device of a system administrator. An identifier of device 1101 is provided (e.g. a device PIN (product identification number), or any other suitable identifier, which will generally be tied to a database of identifiers enabling server 107 to communicate specifically with device 1101 and further store attributes etc. of device 1101). When checkbox 501 of GUI 500 is checked, server 107 transmits a message 601 to device 1101 via the data channel on link 109, with reference to FIG. 6, message 601 triggering device 1101 to enter the verification mode upon receiving message 601 from server 107 (the verification mode referred to in GUI 500 as "Get You Home" mode).

Similarly, when checkbox 501 is unchecked, and/or when checkbox 502 is checked, server 107 transmits a message 602 to device 1101 via the data channel on link 109 to trigger device 1101 to exit the verification mode. Device 1101 exits verification mode upon receiving message 602 from server 107.

GUI 500 can be provided when requested via input device 127, or any other suitable input device. For example, a system administrator can be informed of the dates that device 1101 is roaming and the respective verification modes can be turned on and off via GUI 500 as required. In some implementations, a range of dates that device 1101 is roaming can also be provided and the transmission of messages 601, 602 can occur automatically on those dates at any suitable time. Furthermore, any suitable exchange of data can occur between device 1101 and server 107 to verify that messages 601, 602 are received and that device 1101 has correspondingly entered and exited the verification mode.

Figure 7:
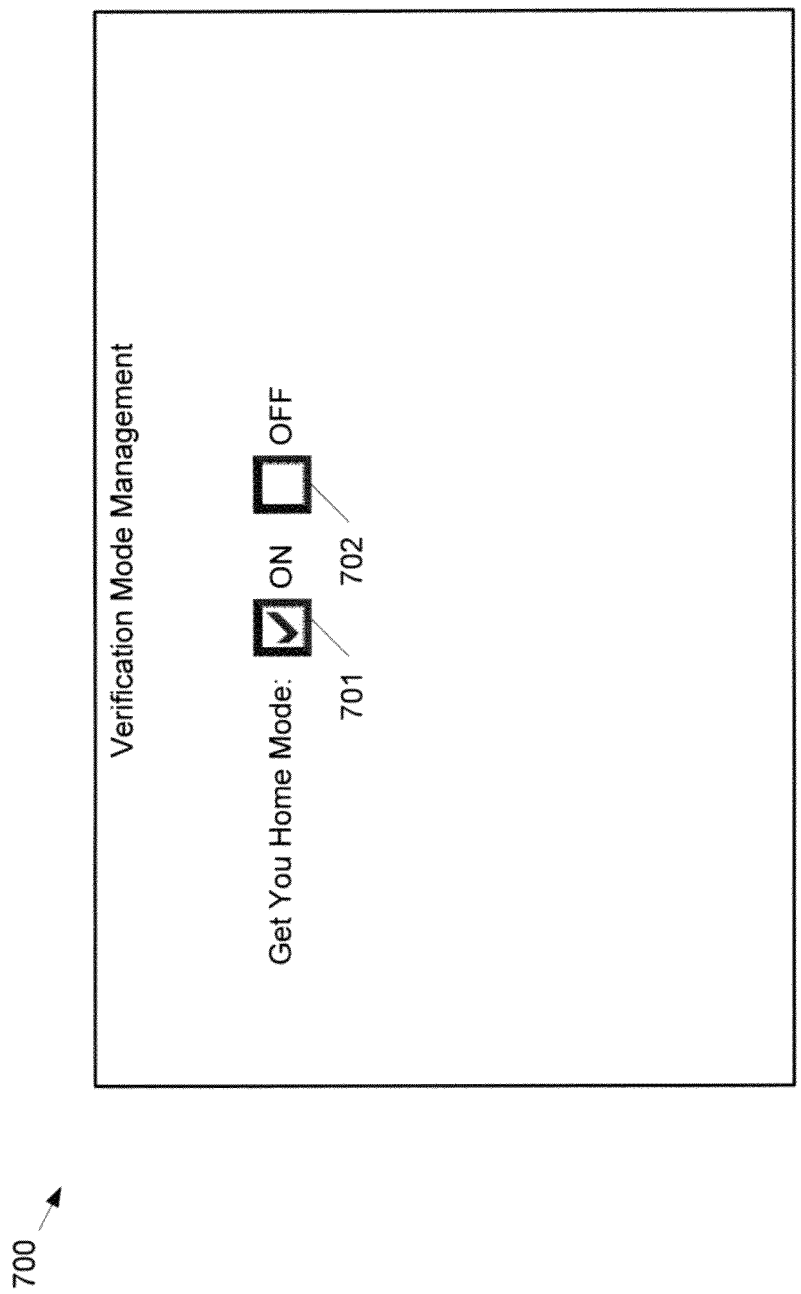
FIG. 7 depicts a representation of a client side GUI for turning on a verification mode in the mobile communication device of FIG. 1, according to non-limiting implementations.
Figure 8:
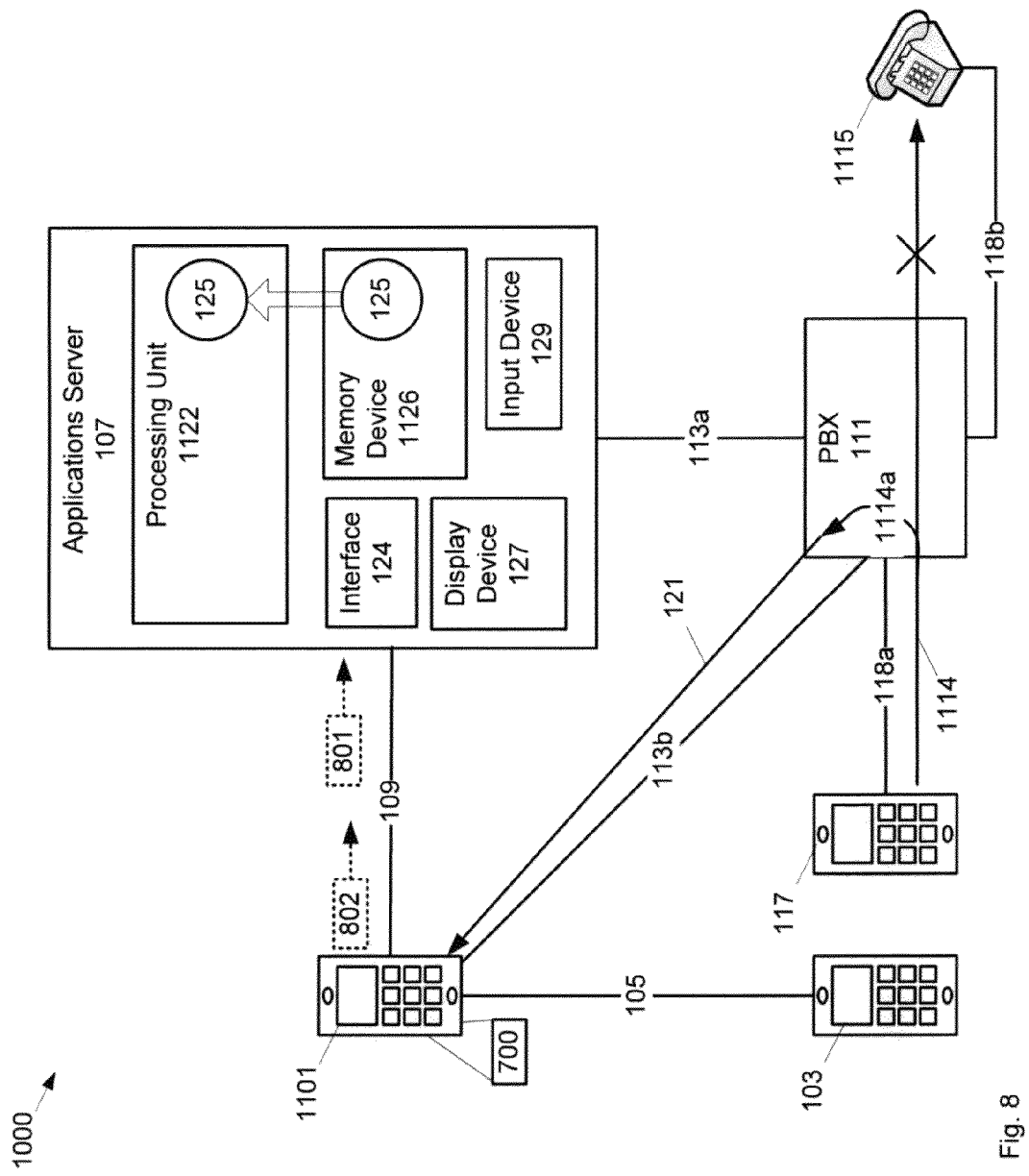
FIG. 8 depicts a block diagram of a system for placing a mobile communication device into a verification mode, according to non-limiting implementations.

In some implementations, device 1101 can enter the verification mode by way of a graphic user interface (GUI) 700, as depicted in FIG. 7 according to non-limiting implementations. GUI 700 can be provided at display device 216 of device 1101. When checkbox 701 of GUI 700 is checked, device 1101 enters the verification mode (referred to in GUI 700 as "Get You Home" mode): e.g. device 1101 enters verification mode upon receiving input data from input device 217, the input data indicative that device 1101 is to be placed in verification mode; processing unit 212 detects that checkbox 701 is checked and causes device 1101 to enter the verification mode. In some implementations device 1101 can optionally transmits a message 801 to server 107 via the data channel on link 109, as depicted in FIG. 8 (similar to FIG. 1, with like elements having like numbers), to notify server 107 that device 1101 has entered the verification mode. Message 801 indicates that device 1101 is in the verification mode.

Similarly, when checkbox 701 is unchecked, and/or when checkbox 702 is checked, device 1101 exits the verification mode and transmits a message 802 to server 107 via the data channel on link 109, to notify server 107 that that device 1101 has exited the verification mode.

GUI 700 can be provided when requested via input device 217. For example, GUI 700 can be provided upon request, for example, when requested by a user, to cause device 1101 to enter the verification mode. Furthermore, any suitable exchange of data can occur between device 1101 and server 107 to verify that messages 801, 802 are received.

In particular non-limiting implementations, method 400 can be provided within a mobile voice service (MVS), with application 150 and application client 205 respectively comprising server application and a client application of the MVS. Within MVS, message 119 comprises an invite message, also known as a "bInvite". Within these implementations, an incoming call to device 1101 can be referred to as an MT (mobile terminated) call, and an outgoing call from device 1101 can be referred to as an MO (mobile originated) call. Furthermore, it is appreciated that device 1101 is associated with a cellular number (e.g. cellular telephone number) that can be used to call device 1101 (e.g. as when device 103 calls device 1101 using link 105).

Figure 9:
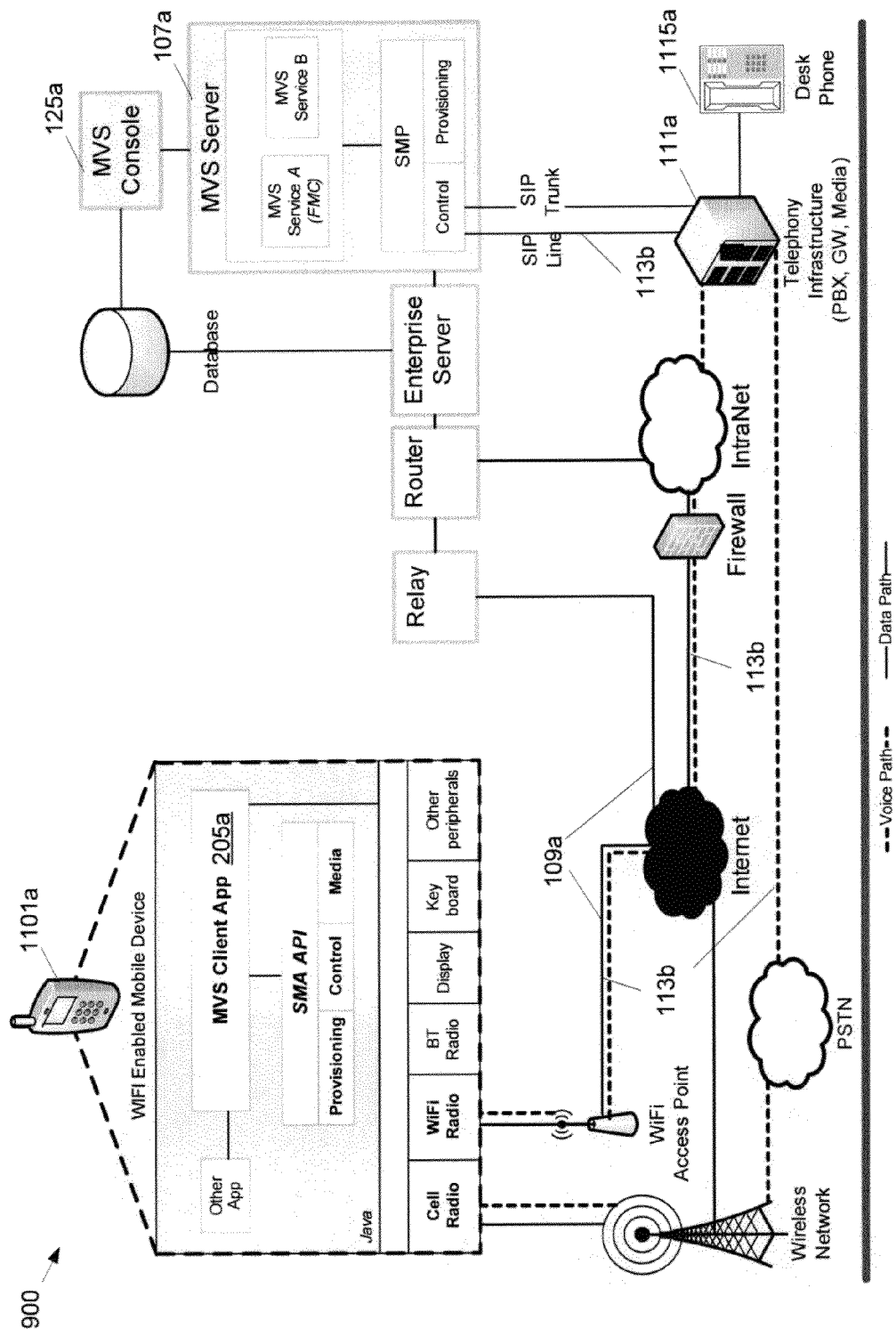
FIG. 9 depicts a block diagram of a system for handling a call received at a mobile communication device, according to non-limiting implementations.

For example, FIG. 9 depicts non-limiting implementations of an MVS system 900, similar to system 1000, with like elements having like numbers, however with an "a" appended thereto. For example, device 1101a is similar to device 1101. However, FIG. 9 further depicts infrastructure at device 1101a, server 107a and in the various links. For example, device 1101a comprises a cell radio, a Wi-Fi Radio, a BT (Bluetooth™) radio, a display, a keyboard, other peripherals, other apps, and an SMA (session manager application) application programming interface (API), which includes provisioning, control and media modules. Communication links between device 1101a and server 107a include a Wi-Fi access point, the Internet, at least one Relay, at least one router and a business sever (which stores data in a database). Furthermore, communication between device 1101a and PBX 111a can be carried via a wireless network and the PSTN, or alternatively between the Wi-Fi access point, the Internet, a Firewall and an intranet. Server 107a includes various MVS services such as a Service A (FMC, a Fixed-mobile convergence module) and a Service B, with PBX like services provided using one or both of Service A and Service B. Server 107a further includes SMPs (symmetric multi-processors), or control and provisioning, and communicates with PBX 111a via SIP (Session Initiation Protocol) lines and/or a SIP trunk. PBX 111a can include any suitable telephony infrastructure including but not limited to suitable gateways (GW) and media.

There are a number of situations that can be dealt with using implementations provided herein:

Scenario 1: MT call; device 1101 has received a bINVITE and then a call associated with MVS server 107 with false ANI.

Device 1101 rings and when device 1101 answers the call, device 1101 sends confirmation tone 301 to server 107, server 107 responds with tone 303 and the audio is enabled in both directions.

Scenario 2: MT call; device 1101 has received a bINVITE and then a call directly to the cellular number.

Device 1101 rings and when the device 1101 answers the call, sends confirmation tone 301. However, as server 107 is not on the call the audio is muted for a timeout period and then enabled, the call being changed to be a regular cellular call. Device 1101 will initially provide an indication of an incoming call from the wrong party and the wrong line. When the call switches over, the correct calling party number, name and line is provided.

Scenario 3: MT call; device 1101 has not received a bINVITE but receives a call associated with MVS server 107 with false ANI.

Device 1101 rings and when the device 1101 answers the call, sends confirmation tone 301 to server 107; server 107 responds with tone 303 and the audio is enabled in both directions. When the call comes in it is shown initially as a cellular call.

Scenario 4: MT call; device 1101 has not received a bINVITE but receives a call directly to the cellular number.

This is initially the same as Scenario 3, so the same solution can be used. Device 1101 rings showing the call as a cellular call. Device 1101 rings and when the device 1101 answers the call, sends confirmation tone 301. As server 107 is not on the call, the audio is muted for a timeout period and then enabled, the call being changed to be a regular cellular call.

Scenario 5: Call to the cellular number directly (this is the same as Scenario 4 as far as device 1101 can tell).

This is initially the same as Scenario 3, so the same solution can be used. Device 1101 rings showing the call as a cellular call. Device 1101 rings and when the device 1101 answers the call, sends confirmation tone 301. As server 107 is not on the call, the audio is muted for a timeout period and then enabled, the call being changed to be a regular cellular call.

Scenario 6: MO Call; device 1101 has received a provisional response from MVS server 107 and then a call associated with MVS server 107 with false ANI.

Device 1101 answers the call, sends confirmation tone 301 to server 107 and receives back from server 107 a response, tone 303. Server 107 continues to set up the call to the destination party.

Scenario 7: MO call; device 1101 has received a provisional response from MVS server 107 and then a call directly to the cellular number.

Device 1101 answers the call, sends a confirmation tone 301 to server 107. The calling device can detect tone 301, but as it doesn't respond device 1101 drops the call. The call is reported back as a failure to device 1101 by a suitable component of the network.

Scenario 8: MO call; device 1101 has not received a provisional response from MVS server 107 but receives a call associated with MVS server 107 with false ANI.

Device 1101 answers the call, sends a confirmation tone 301 to server 107 and receives back from server 107 a response, tone 303. Server 107 continues to set up the call to the destination device.

Scenario 9: MO call, device 1101 has not received a provisional response from MVS server 107 but receives a call directly to the cellular number.

This is initially the same as Scenario 8. Device 1101 answers the call, sends a confirmation tone 301 to server 107. The calling device can detect tone 301, but as it doesn't respond device 1101 drops the call. The call is reported back as a failure to device 1101.

Specific non-limiting implementations of an MVS system will hereafter be described with reference to FIGS. 10 to 18. It is appreciated that method 400 can be implemented in the MVS system of FIGS. 10 to 18.

Figure 10:
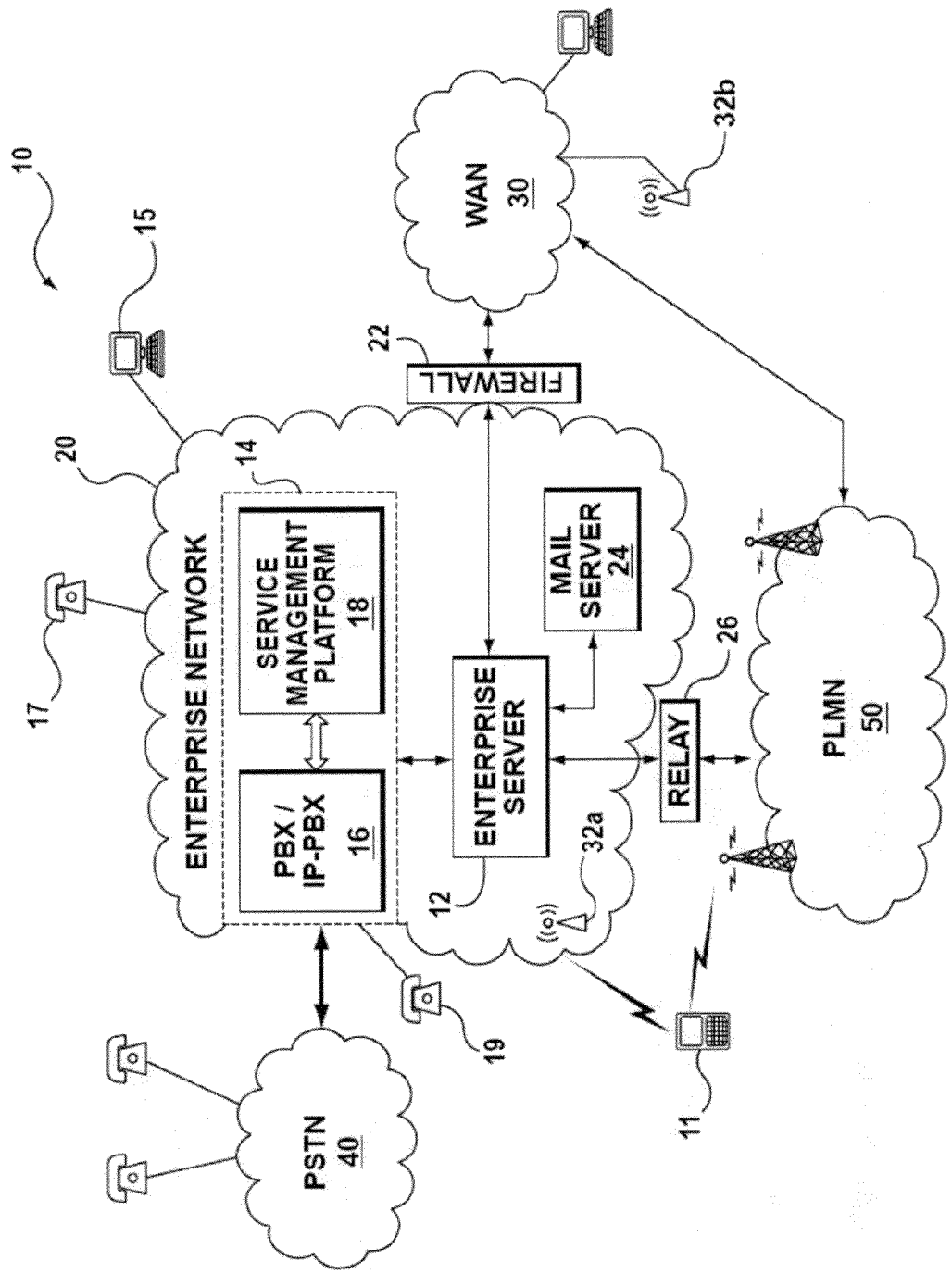
FIG. 10 depicts, in block diagram form, an example system for managing enterprise-related mobile calls, including an enterprise communications platform, according to non-limiting implementations.

Reference is now made to FIG. 10, which shows, in block diagram form, an example system, generally designated 10, for the control and management of communications, within which method 400 can be implemented. It is generally understood that system 10 comprises an MVS system. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a PSTN 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile device 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 12 interface of the dual-mode device 11 and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a PBX although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signalling protocols for setting up and tearing down circuit-switched connections through the PSTN 40 and related signalling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, all transfer, call park, etc.

Figure 11:
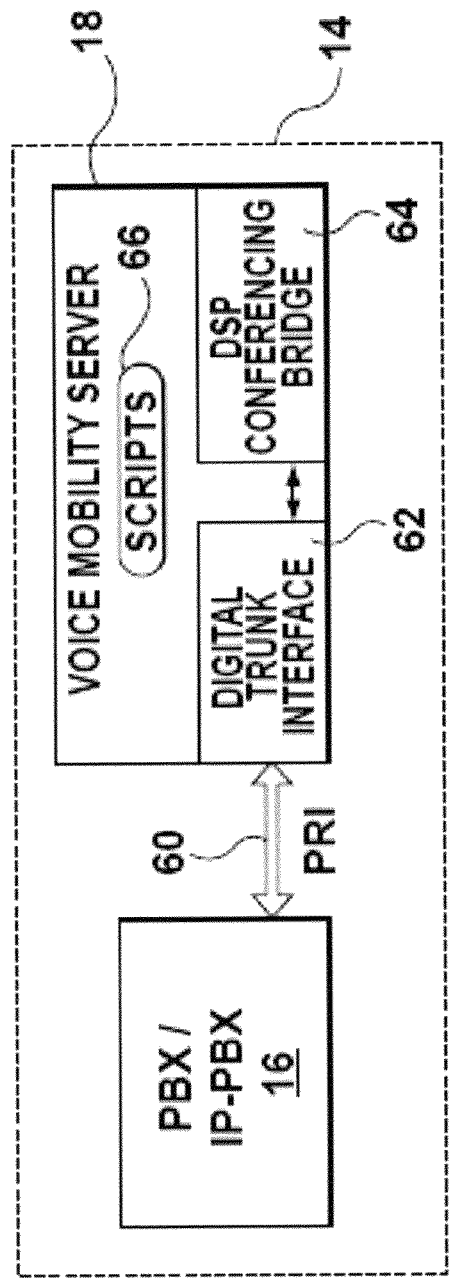
FIG. 11 depicts in block diagram form, further details of an embodiment of the enterprise communications platform, according to non-limiting implementations.
Figure 12:
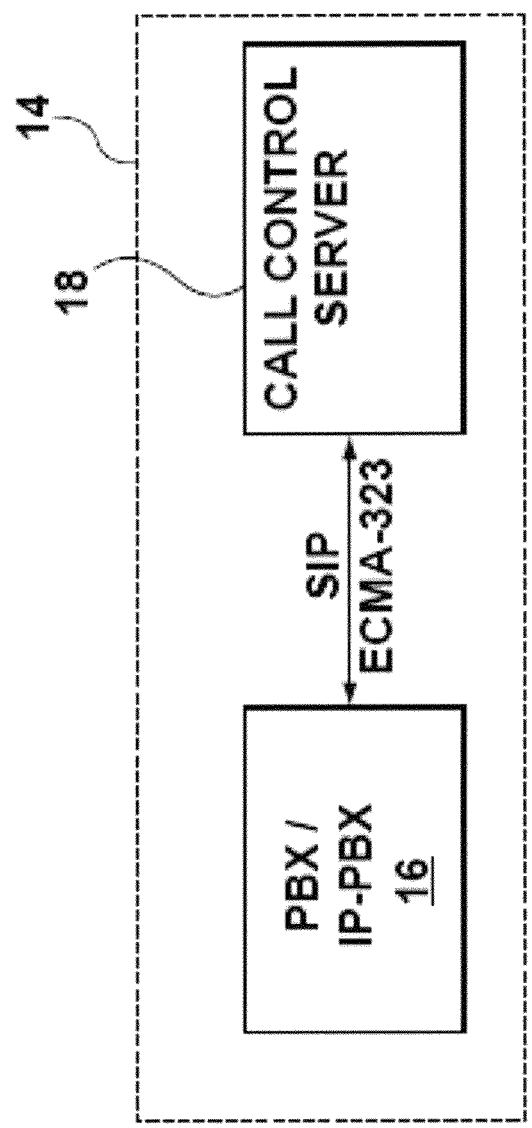
FIG. 12 depicts another embodiment of the enterprise communications platform, according to non-limiting implementations.
Figure 13:
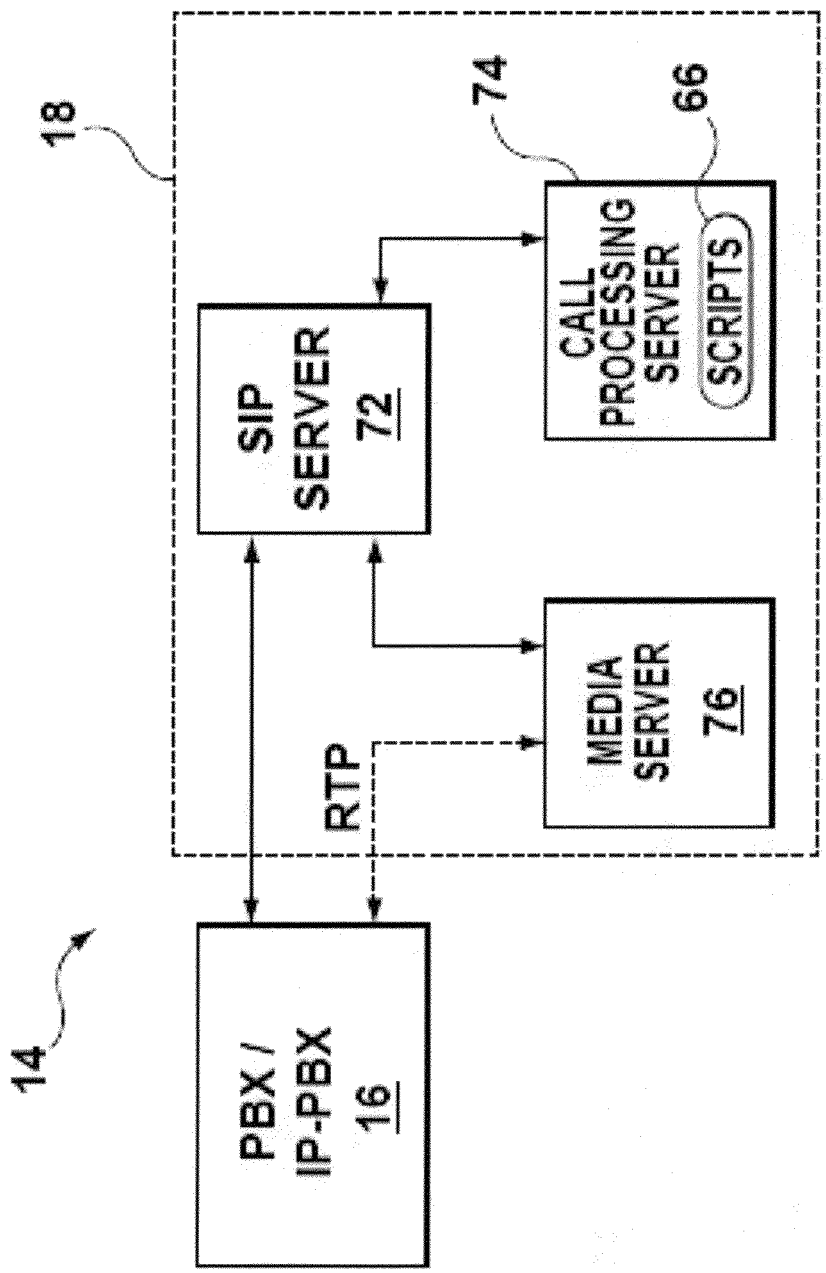
FIG. 13 depicts yet another embodiment it the enterprise communications platform, according to non-limiting implementations.
Figure 14:
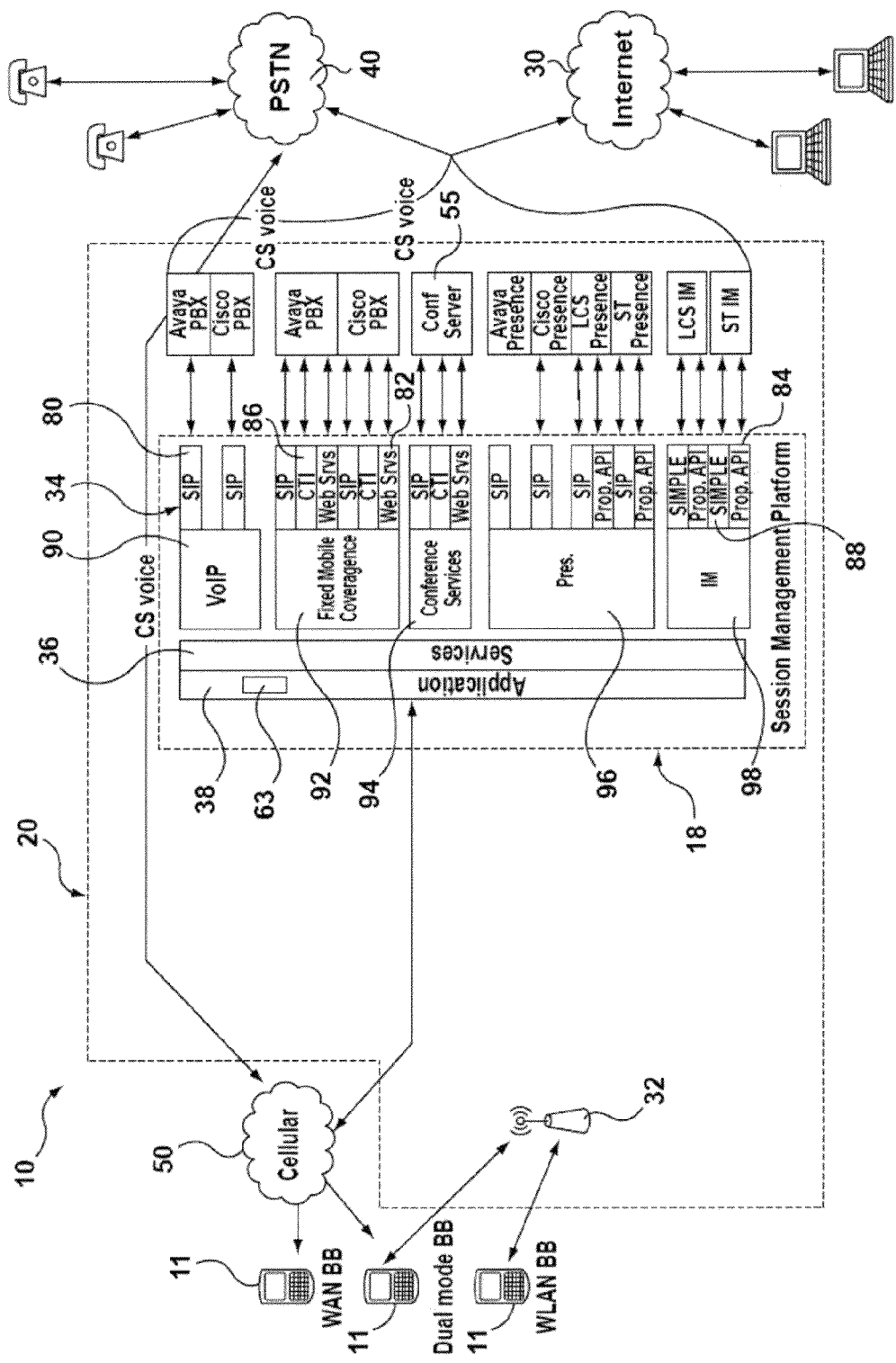
FIG. 14 depicts further details of the enterprise communications platform of FIG. 13, according to non-limiting implementations.

Reference is now made to FIGS. 11 to 13, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 11 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 12 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 13 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Reference is now made to FIG. 13, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signalling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 13, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 15 through 18, the general operation of the system 10 using SIP 80 as the signalling protocol will be discussed, although it is recognized that the present system is not limited to the processes discussed herein. The signalling descriptions that follow are based on Third Party Call Control architecture, such as that illustrated in FIG. 12 or 14. It will be appreciated that similar but slightly modified signalling may be used in a First Party Call Control architecture, wherein the PBX 16 will pass media through to the SMP 18 for direct media handling by the SMP 18. Variations in the signalling to adapt to various architectures will be appreciated by those ordinarily skilled in the art.

Figure 15:
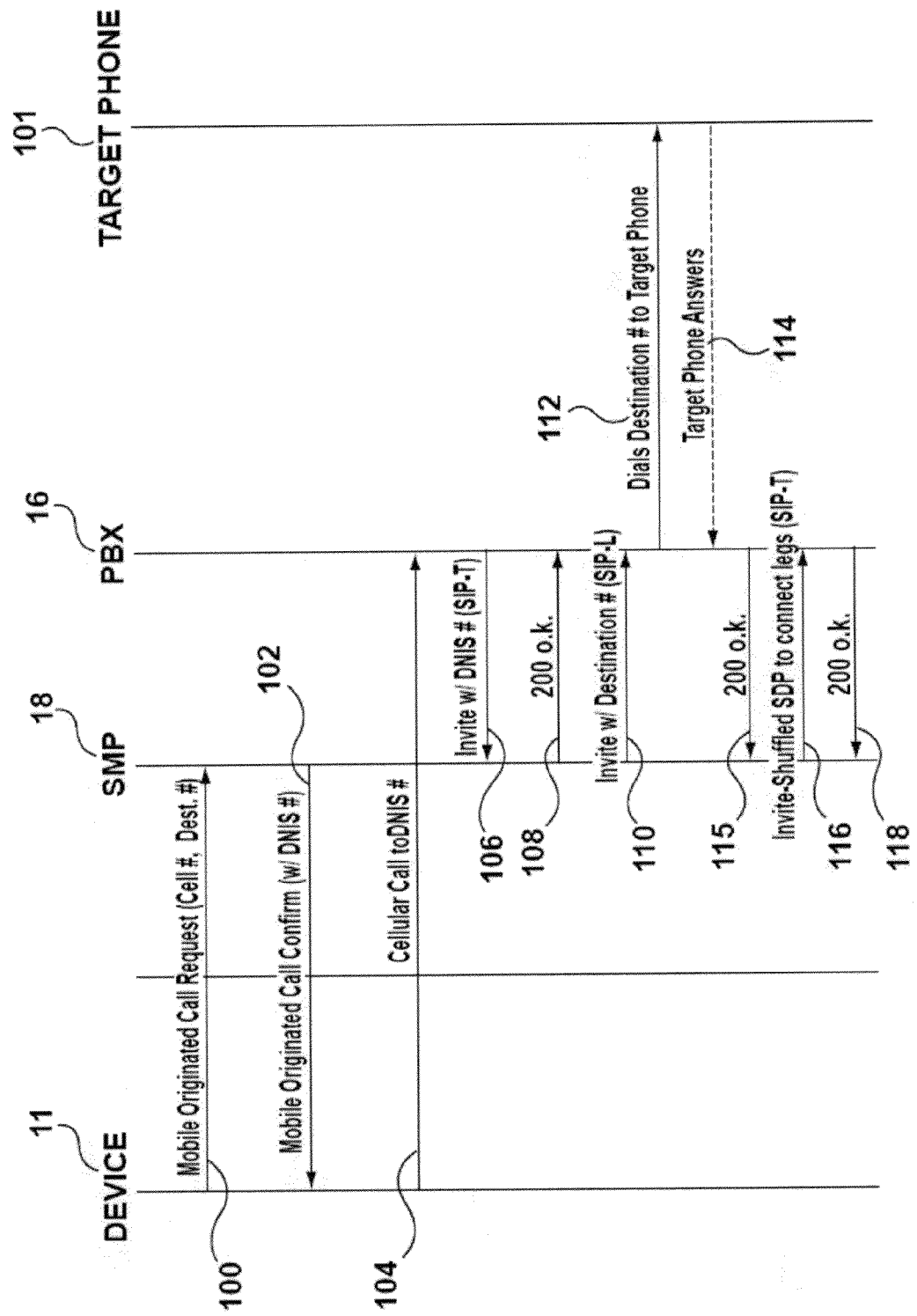
FIG. 15 depicts a signalling diagram generally indicating how mobile-originated, mobile-initiated calls are processed by the network of FIG. 14, according to non-limiting implementations.

FIG. 15 provides a signalling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 16:
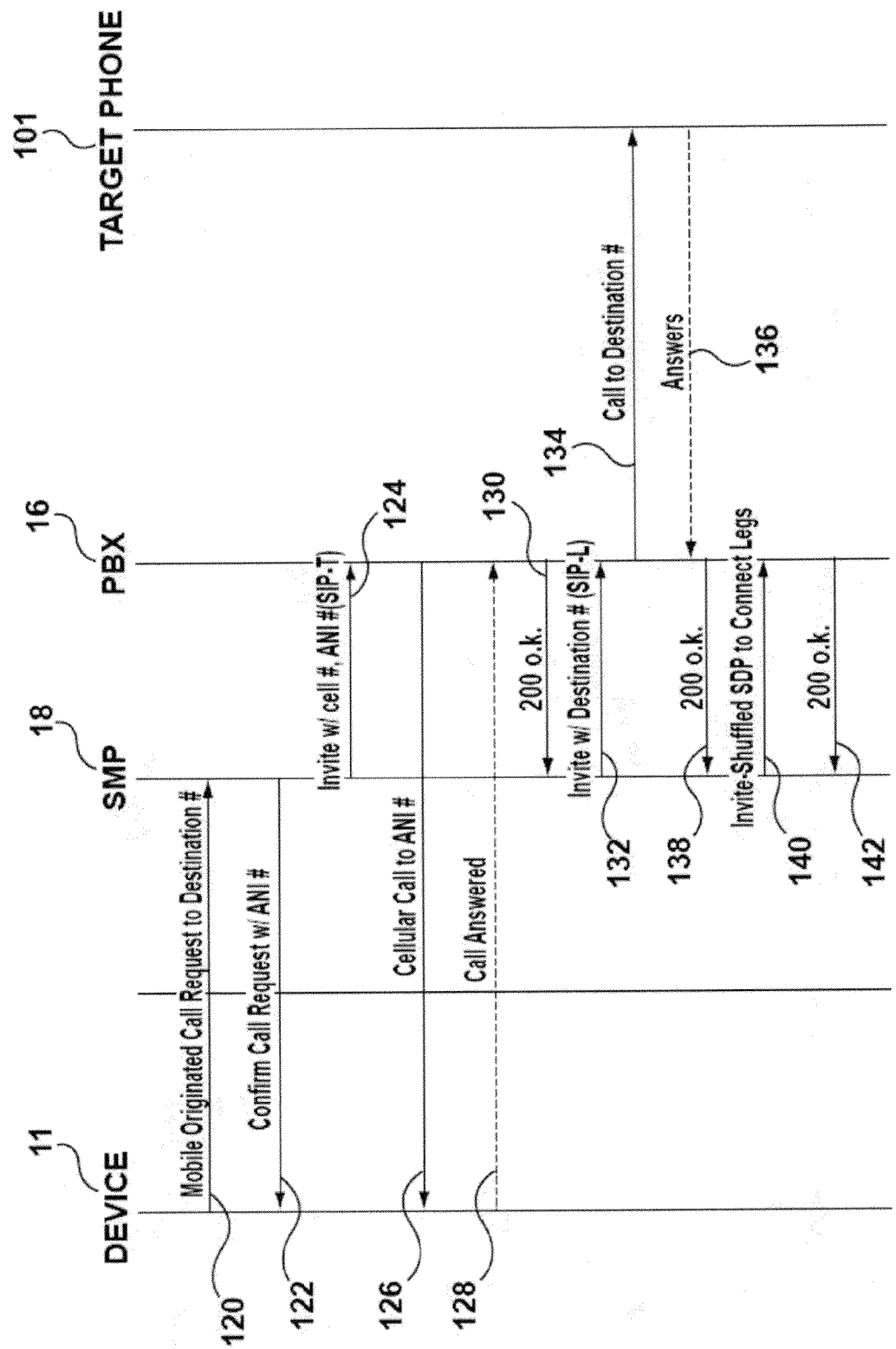
FIG. 16 depicts a signalling diagram generally indicating how mobile-originated, PBX (Public Branch Exchange)-initiated, calls are processed by the network of FIG. 14, according to non-limiting implementations.

The above description is known as a "mobile initiated" call, because the SMP 18 provides the mobile device 11 with the DNIS number into which the mobile device 11 has called. Alternatively, the mobile originated call could be "PBX initiated", as shown in FIG. 16. Specifically, in a PBX-initiated call, upon receipt of the mobile originated call request (block 120), the SMP 18 confirms receipt of the call to the mobile device 11 with an ANI number (block 122), which the mobile device 11 uses to identify the incoming call from the PBX 16. The PBX 16 then sends an invite over SIP-T to the PBX 16 with the cellular number of the device 11 and the ANI number that is attached to the outgoing call (block 124). Upon receipt of the invite, the PBX 16 makes a cellular call to the device 11 (block 126), which is answered by the device 11 (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device 11 is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 17:
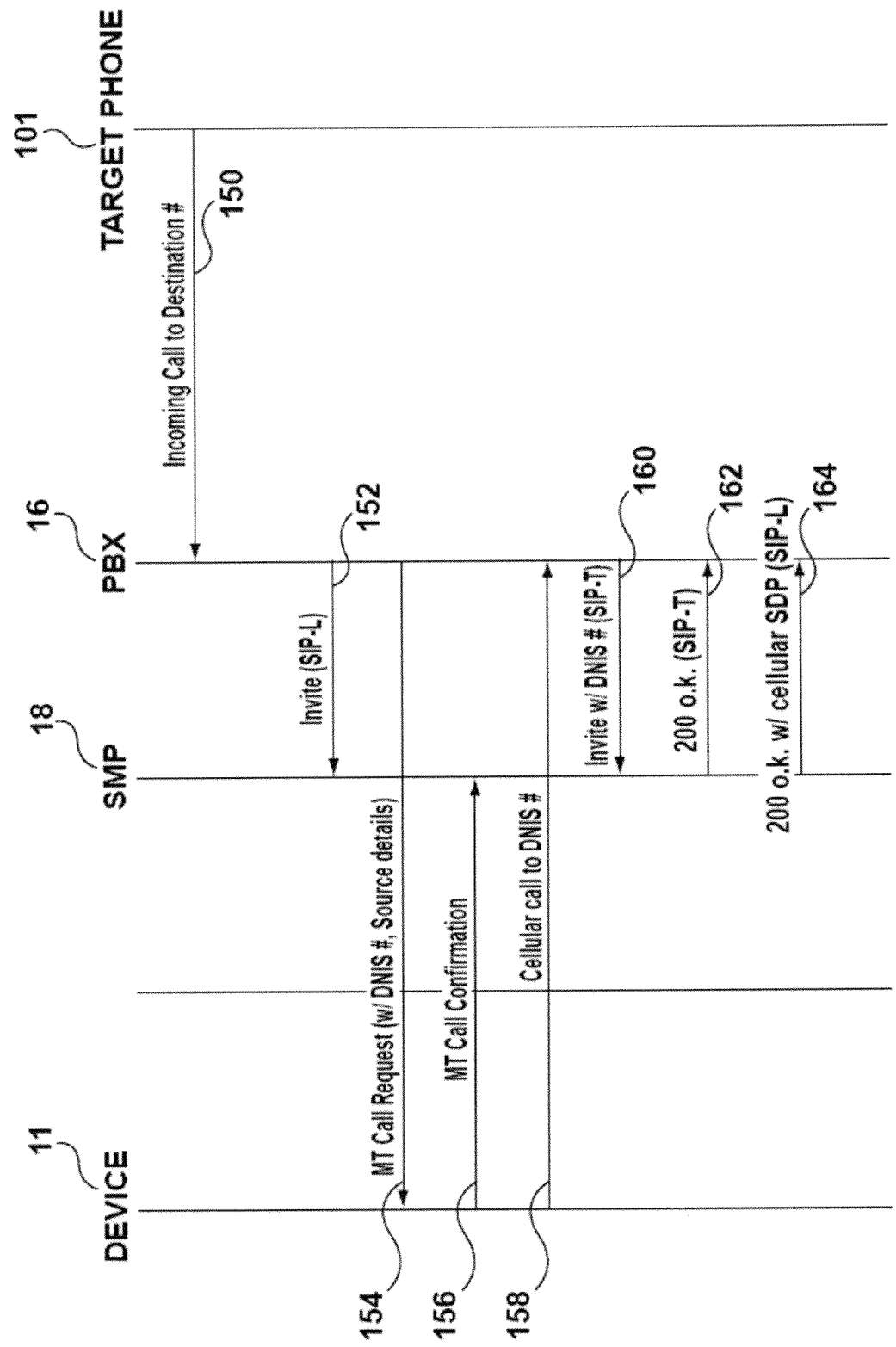
FIG. 17 depicts a signalling diagram generally indicating how mobile-terminated, mobile-initiated calls are processed by the network of FIG. 14, according to non-limiting implementations; and, FIG. 18 depicts a signalling diagram generally indicating how mobile-terminated, PBX-initiated calls are processed by the network of FIG. 14, according to non-limiting implementations.
Figure 18:
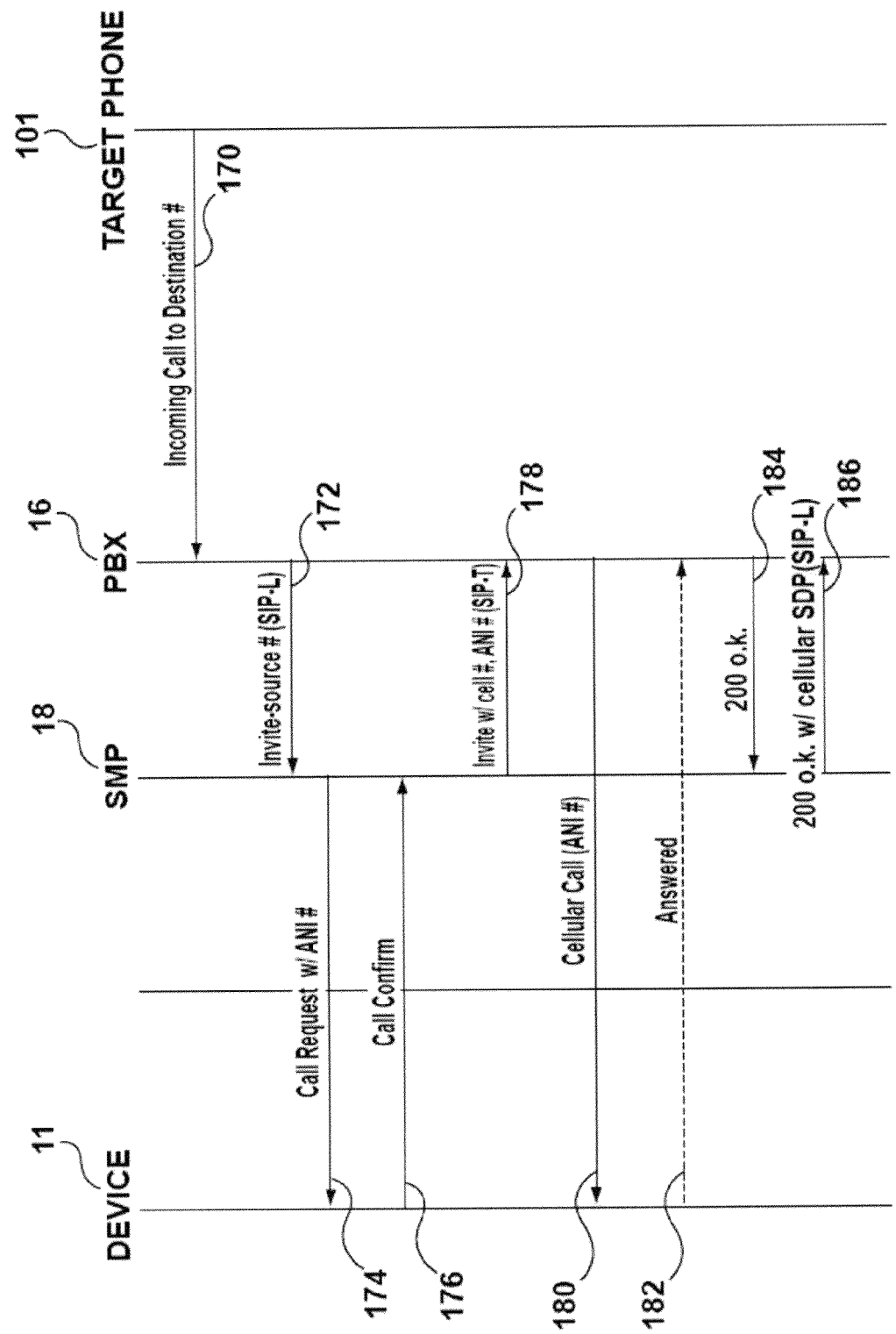

FIGS. 17 and 18 are signalling diagrams illustrating a mobile terminated call utilizing SIP 80. Specifically, and for the purposes of this disclosure, the target phone 101 is originating the call, which will send a call to the mobile device. Turning first to FIG. 17, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 17 illustrates a "mobile-initiated" call, because, as discussed above with respect to FIGS. 15 and 16, the SMP 18 presents the mobile device 11 with the DNIS number at the PBX 16 into which to call. However, it is also possible to employ a "PBX-initiated" mobile terminated call, as shown in FIG. 18, where the PBX 16 sends an incoming call to the device 11 with the ANI number of the target phone 101.

Specifically, similar to the mobile initiated call described above and shown in FIG. 17, the target phone 101 sends an incoming call to the destination number of the device 11, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device 11 should expect in the incoming call, the call request being confirmed by the device 11 (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device 11 to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 15 and 16, the SMP 18 remains in control of the signalling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

In any event, method 400 can be implemented in the system of FIGS. 10 to 18 by adapting device 11 to provide a tone when a mangled ANI is received and device 11 (corresponding to device 1101 of system 1000) is in a verification mode, as described above, with service management platform 18 (corresponding to server 107 of system 1000) adapted to enter and exit a verification mode in which a corresponding tone can be provided via PBX 16 (corresponding to PBX 111 of system 1000).

Those skilled in the art will appreciate that in some implementations, the functionality of device 101 and server 107 can be implemented using pre-programmed hardware or firmware elements (e.g., application specific integrated circuits (ASICs), electrically erasable programmable read-only memories (EEPROMs), etc.), or other related components. In other implementations, the functionality of device 101 and server 107 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method comprising:
   when an automated number identification (ANI) number of a call is not on a list of ANI numbers stored at a mobile device where the call is received, providing a tone on the call; and,
   when a corresponding tone is detected on the call, enabling an applications client at the mobile device to provide services available via an applications server, and otherwise handling the call as received from a communication device.

2. The method of claim 1, wherein the providing the tone is initiated only when the mobile device is in a verification mode.

3. The method of claim 2, further comprising one or more of:
   entering the verification mode when the mobile device is roaming outside of a home communication network;
   exiting the verification mode when the mobile device is next in direct communication with the home communication network;
   entering the verification mode upon receiving an enter verification mode message from the applications server;
   exiting the verification mode upon receiving an exit verification mode message from the applications server;
   entering the verification mode upon receiving enter verification mode input from an input device; and,
   exiting the verification mode upon receiving exit verification mode input from the input device.

4. The method of claim 1, further comprising, at the applications server: determining that the tone has been provided; and causing the corresponding tone to be provided.

5. The method of claim 1, further comprising, at the applications server: determining that the tone has been provided by receiving a message from a PBX (Private Branch Exchange) where the tone is detected; and causing the corresponding tone to be provided by transmitting a message to the PBX to trigger the PBX to provide the corresponding tone.

6. The method of claim 1, wherein each of the tone and the corresponding tone comprises a DTMF (Dual-tone multi-frequency) tone.

7. The method of claim 1, wherein the tone and the corresponding tone are one of similar and different.

8. A mobile device comprising:
   a processor interconnected with a memory and a communication interface, the processor enabled to:
   when an automated number identification (ANI) number of a call is not on a list of ANI numbers stored at the mobile device where the call was received, provide a tone on the call; and,
   when a corresponding tone is detected on the call, enable an applications client at the mobile device to provide services available via an applications server, and otherwise handle the call as received from a communication device.

9. The mobile device of claim 8, wherein the processor is further enabled to initiate providing the tone only when the mobile device is in a verification mode.

10. The mobile device of claim 9, wherein the processor is further enabled to one or more of:
    enter the verification mode when the mobile device is roaming outside of a home communication network;
    exit the verification mode when the mobile device is next in direct communication with the home communication network;
    enter the verification mode upon receiving an enter verification mode message from the applications server;
    exit the verification mode upon receiving an exit verification mode message from the applications server;
    enter the verification mode upon receiving enter verification mode input from an input device; and,
    exit the verification mode upon receiving exit verification mode input from the input device.

11. The mobile device of claim 8, wherein each of the tone and the corresponding tone comprises a DTMF (Dual-tone multi-frequency) tone.

12. The mobile device of claim 8, wherein the tone and the corresponding tone are one of similar and different.

13. A method comprising:
    determining, at an applications server, that a tone has been provided on a call associated with an automated number identification (ANI) number, the tone for indicating that a mobile device is seeking verification that the call is associated with the applications server; and,
    causing a corresponding tone to be provided on the call to trigger the mobile device to enable an applications client to provide services available via the applications server.

14. The method of claim 13, herein determining that a tone has been provided comprises: receiving a message from a PBX (Private Branch Exchange) where the tone is detected; and causing the corresponding tone to be provided by transmitting a message to the PBX to trigger the PBX to provide the corresponding tone.

15. An applications server comprising:
    a processor interconnected with a communications interface, the processor enabled to:
    determine that a tone has been provided on a call associated with an automated number identification (ANI) number, the tone for indicating that a mobile device is seeking verification that the call is associated with the applications server; and,
    cause a corresponding tone to be provided on the call to trigger the mobile device to enable an applications client to provide services available via the applications server.

16. The applications server of claim 15, wherein the processor is further enabled to:

determine that a tone has been provided by receiving a message from a PBX (Private Branch Exchange) where the tone is detected; and, cause the corresponding tone to be provided by transmitting a message to the PBX to trigger the PBX to provide the corresponding tone.

17. A system comprising:
a mobile device and an applications server,
the mobile device enabled to:
   when an automated number identification (ANI) number of a call is not on a list of ANI numbers stored at the mobile device where the call was received, provide a tone on the call; and,
   when a corresponding applications client at the mobile device to provide services available via the applications server, and otherwise handle the call as received from a communication device; and,
the applications server enabled to provide the corresponding tone when the tone is received at the applications server.

18. A computer program product, comprising a non-transitory computer usable medium having a computer readable program code configured to be executed to implement a method comprising:

when an automated number identification (ANI) number of a call is not on a list of ANI numbers stored at a mobile device where the call was received, providing a tone on the call; and, when a corresponding tone is detected on the call, enabling an applications client at the mobile device to provide services available via an applications server, and otherwise handling the call as received from a communication device.

19. A computer program product, comprising a non-transitory computer usable medium having a computer readable program code configured to be executed to implement a method comprising:

determining, at an applications server, that a tone has been provided on a call associated with an automated number identification (ANI) number, the tone for indicating that a mobile device is seeking verification that the call is associated with the applications server; and, causing a corresponding tone to be provided on the call to trigger the mobile device to enable an applications client to provide services available via the applications server.

\* \* \* \* \*